(12) United States Patent
Andersen

(10) Patent No.: US 10,150,670 B2
(45) Date of Patent: Dec. 11, 2018

(54) PROCESS FOR GENERATION OF SYNTHESIS GAS BY FLUE GAS RECYCLE

(71) Applicant: Haldor Topsøe A/S, Kgs. Lyngby (DK)

(72) Inventor: Niels Ulrik Andersen, Gentofte (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/527,202

(22) PCT Filed: Nov. 25, 2015

(86) PCT No.: PCT/EP2015/077600
§ 371 (c)(1),
(2) Date: May 16, 2017

(87) PCT Pub. No.: WO2016/083434
PCT Pub. Date: Jun. 2, 2016

(65) Prior Publication Data
US 2017/0369312 A1    Dec. 28, 2017

(30) Foreign Application Priority Data
Nov. 25, 2014   (DK) ................................. 2014 00682

(51) Int. Cl.
*C01B 3/48* (2006.01)
*C01B 3/34* (2006.01)
*C01C 1/04* (2006.01)

(52) U.S. Cl.
CPC .................. *C01B 3/48* (2013.01); *C01B 3/34* (2013.01); *C01C 1/0488* (2013.01); *C01B 2203/0233* (2013.01); *C01B 2203/0238* (2013.01); *C01B 2203/0244* (2013.01); *C01B 2203/0283* (2013.01); *C01B 2203/0445* (2013.01); *C01B 2203/0475* (2013.01); *C01B 2203/061* (2013.01); *C01B 2203/068* (2013.01); *C01B 2203/0811* (2013.01); *C01B 2203/142* (2013.01); *C01B 2203/143* (2013.01)

(58) Field of Classification Search
None
See application file for complete search history.

(56) References Cited

U.S. PATENT DOCUMENTS

| 4,479,925 | A | * | 10/1984 | Shires ..................... C01B 3/025 252/373 |
| 8,303,923 | B2 | | 11/2012 | Han |
| 2006/0135629 | A1 | * | 6/2006 | Abbott .................... C01B 3/382 518/702 |

(Continued)

FOREIGN PATENT DOCUMENTS

WO   WO 2014/042042 A1   3/2014

*Primary Examiner* — Medhanit W Bahta
(74) *Attorney, Agent, or Firm* — Blank Rome LLP

(57) ABSTRACT

A novel process for synthesis gas generation comprises treating a hydrocarbon feed in a primary reformer (PR), compressing at least part of the flue gas from the primary reformer in a compressor (C1), and feeding the compressed flue gas to a secondary reformer (SR) together with the primary reformer effluent. In the process, enriched air (EA) is added either to the primary reformer, to the secondary reformer or both. The process is especially suited for co-production of ammonia and methanol or for production of either ammonia or methanol. The total $CO_2$ emission is lowered considerably by using the process of the invention.

7 Claims, 1 Drawing Sheet

(56) References Cited

U.S. PATENT DOCUMENTS

| | | | |
|---|---|---|---|
| 2007/0264186 A1* | 11/2007 | Dybkjaer | B01J 8/062 423/418.2 |
| 2008/0039652 A1 | 2/2008 | Thiebaut | |
| 2012/0195817 A1 | 8/2012 | Singh et al. | |
| 2015/0202589 A1 | 7/2015 | Sakurai et al. | |

* cited by examiner

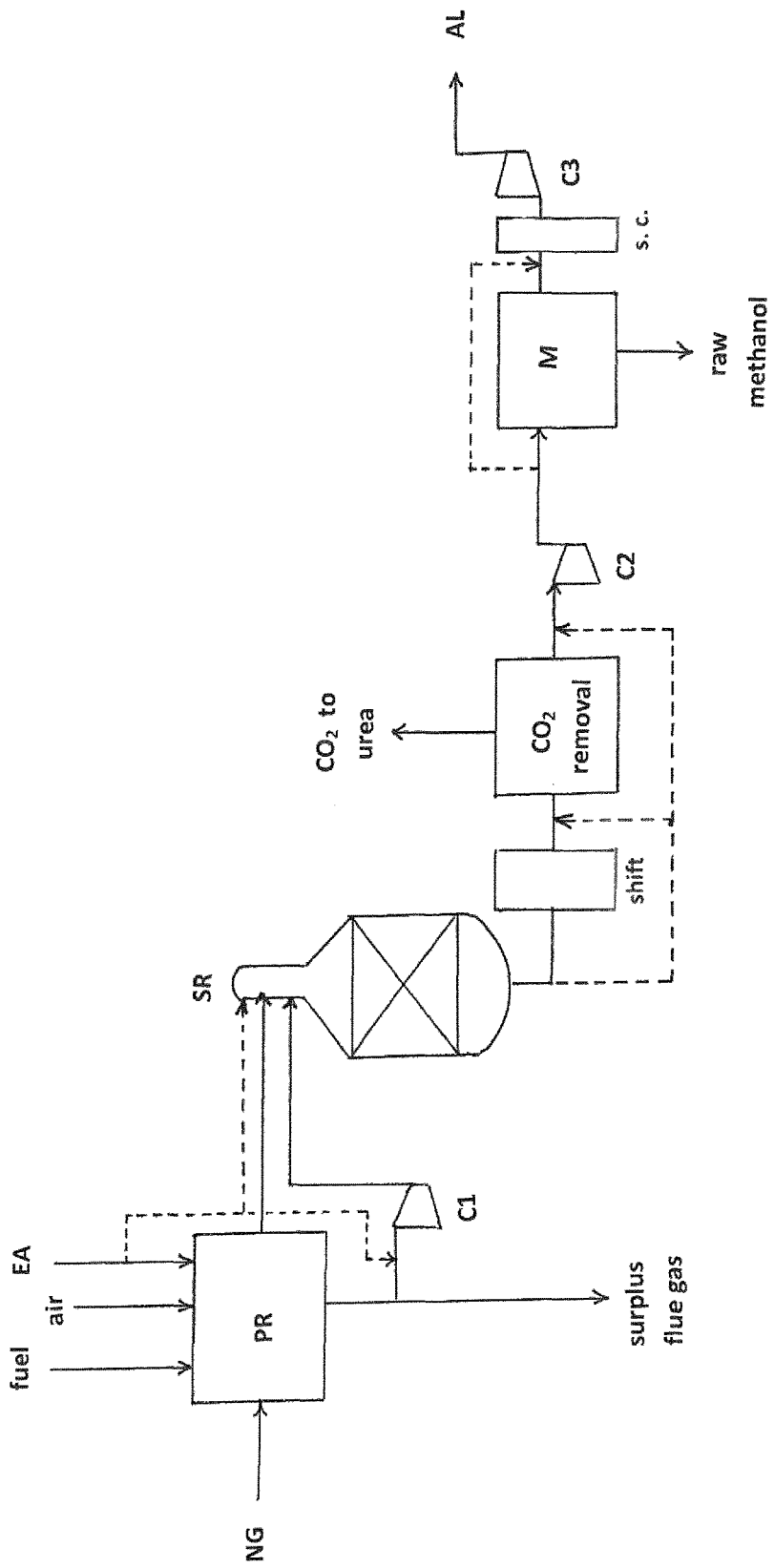

PROCESS FOR GENERATION OF SYNTHESIS GAS BY FLUE GAS RECYCLE

The present invention relates to a process for generation of synthesis gas by flue gas recycle. The process is especially suited for co-production of ammonia and methanol or for production of either ammonia or methanol.

More specifically, the invention is based on the fact that the consumption of hydrocarbon feed gas, such as natural gas (NG), in e.g. an ammonia plant and the emission of carbon dioxide from said plant can be significantly reduced by recycling the flue gas from the primary reformer to the secondary reformer as oxidant.

According to the invention, the carbon dioxide, which is also recycled with the flue gas, can be utilized for co-production of methanol, which also will reduce the carbon dioxide emission. Advantageously, enriched air can be used as combustion air for the primary reformer burners in order to improve the hydrogen/nitrogen ratio. However, enriched air can be added to the secondary reformer instead of being added to the primary reformer, or it can be added simultaneously to both reformers.

Co-production of ammonia and methanol is known as such from U.S. Pat. No. 8,692,034 belonging to the applicant. A $CO_2$ pressure swing adsorption ($CO_2$ PSA) off-gas stream is recycled to the primary reformer together with an off-gas fuel stream obtained from ammonia synthesis. The partly reformed gas from the primary reformer is further reformed in an air-blown secondary reforming stage, but no treatment of the flue gas from the primary reformer is mentioned. After the methanol synthesis step a methanation step is included. No emissions of the $CO_2$ (captured from the methanol and ammonia synthesis) to the surroundings take place.

U.S. Pat. No. 8,303,923, also belonging to the applicant, describes a process for co-production of ammonia and methanol from a hydrocarbon feed. The off-gas fuel containing hydrogen, nitrogen and methane from the ammonia synthesis reactor is returned to the primary reforming stage, but there is no mention of any treatment of the flue gas from the primary reformer being transferred from the primary reformer to the secondary reformer. A methanation step is included after the methanol synthesis step for the conversion of carbon oxides, and water-gas shift (WGS) and $CO_2$ removal steps are avoided.

A process concept called tri-reforming, which is basically a combination of steam reforming and $CO_2$ reforming, where the $CO_2$ originates from flue gas, is described by C. Song, W. Pan and S. T. Srimat in "Tri-reforming of Natural Gas using $CO_2$ in Flue Gas of Power Plants without $CO_2$-Preseparation for Production of Synthesis Gas with desired $H_2/CO$ Ratios", Environmental Challenges and Greenhouse Gas Control for Fossil Fuel Utilization in the $21^{st}$ Century, edited by Maroto-Valer et al., Kluwer Academic/Plenum Publishers, New York 2002, Chapter 18. This concept discloses novel ways of controlling emission of $CO_2$. This includes utilizing $CO_2$, present in flue gases together with $O_2$, $H_2O$ and $N_2$, without first having to separate it from the flue gas. By carrying out tri-reforming, the conversion of $CO_2$ to methanol is enabled. Main differences between the tri-reforming approach and the present invention include the fact that, in tri-reforming, nitrogen in the flue gases is regarded as inert, ammonia is not mentioned as a product of a process including tri-reforming, and use of the commercially available Ni-based catalyst R67 is foreseen.

In connection with the tri-reforming approach, reservations may be expressed with respect to low pressure of synthesis gas (requiring compression of the synthesis gas stream), a high nitrogen content in the synthesis gas and a high volumetric flow in the reformer.

It has now turned out that the flue gas from e.g. ammonia and methanol co-production can be utilized, as nitrogen is required for the ammonia production and the $CO_2$ can be used for increasing the carbon flow, thereby enabling methanol and urea production.

The co-production of ammonia and methanol or the production of either ammonia or methanol are two preferred embodiments of the process according to the invention. Other possible embodiments could, without being restricted thereto, be co-production of ammonia and hydrogen, co-production of methanol and carbon monoxide and co-production of ammonia, methanol and urea.

The appended FIGURE shows the reactor design for carrying out the process according to the present invention. A hydrocarbon feed consisting of a mixture of steam and optionally pre-reformed hydrocarbons, e.g. comprising natural gas (NG), is fed to a primary reformer (PR) together with a fuel and air. Enriched air (EA) is fed either to the primary reformer or to a secondary reformer (SR) or both. At least part of the flue gas from the primary reformer is compressed in a compressor (C1) and fed to a secondary reformer (SR) together with the primary reformer effluent, while the surplus flue gas, if any, is flared.

If for instance only ammonia is to be produced and/or it is desirable to be able to adjust the proportion between methanol and ammonia, then a shift conversion section and a bypass will optionally be necessary.

The effluent from the secondary reformer is fed, optionally via a shift conversion section, to a $CO_2$ removal unit, where $CO_2$ for urea production may be separated from the effluent. As mentioned, the $CO_2$ removal unit may be bypassed. The effluent, whether having passed the $CO_2$ removal unit or not, is compressed in a compressor (C2) and optionally subjected to methanol production in a methanol synthesis unit (M), from where raw methanol is withdrawn. The rest is sent via a compressor (C3) to an ammonia loop (AL).

Upstream of the ammonia loop a synthesis gas clean-up (s.c.) has to be made. As a minimum, CO and $CO_2$ must be removed, e.g. by methanation. A nitrogen wash is also possible.

Thus, with reference to the appended FIGURE, the process according to the invention for generation of synthesis gas, preferably for co-production of ammonia and methanol or for production of either ammonia or methanol, by flue gas recycle comprises the following steps:

treating a hydrocarbon feed in a primary reformer,
compressing at least part of the flue gas from the primary reformer in a compressor, and
feeding the compressed flue gas to a secondary reformer together with the primary reformer effluent,
wherein enriched air is added either to the primary reformer or to the secondary reformer or both.

The hydrocarbon feed is a mixture of steam and optionally pre-reformed hydrocarbons. These hydrocarbons may originate from any hydrocarbon sources that can be used for reformer feeding, such as natural gas.

The method of the invention can also be used for converting a larger amount of $CO_2$ to urea. More specifically, the method of the invention may be used in connection with light natural gases for the production of urea. The $CO_2$ content in the synthesis gas is too low for this purpose, and at present this $CO_2$ deficit is compensated for by producing too much synthesis gas to obtain the necessary $CO_2$ amount. The excess synthesis gas is used as fuel.

Depending on the desired end product(s), a number of further process steps may be added to the above sequence of steps. If for instance synthesis of ammonia and urea is desired, the following further process steps are included:

passing the secondary reformer effluent through a shift conversion section, removing $CO_2$ from the shift conversion effluent, performing a synthesis gas clean-up of the $CO_2$ removal section effluent, and compressing the resulting stream in a compressor and transferring it to an ammonium loop for ammonia synthesis, wherein the amount of $CO_2$ removed in the $CO_2$ removal step is sufficient to convert all the ammonia produced in the ammonium synthesis to urea.

For co-production of ammonia, urea and optionally also methanol, the following further process steps are included:

optionally passing the secondary reformer effluent or part thereof through a shift conversion section, optionally removing all the $CO_2$ or part thereof from the shift converter effluent, compressing the $CO_2$ removal section effluent in a compressor and optionally passing part or all of it through a methanol synthesis section, performing a synthesis gas clean-up of the methanol synthesis section effluent, optionally compressing the resulting stream further in the compressor, and transferring the resulting stream to an ammonium loop for ammonia synthesis, wherein the amount of $CO_2$ removed in the $CO_2$ removal step is sufficient to convert all the ammonia produced in the ammonium synthesis or part thereof to urea.

If production of only methanol is desired, the following further process steps are included:

feeding the secondary reformer effluent directly to the compressor (C2), and passing the effluent from the compressor C2 through a methanol synthesis section, wherein the module M in the synthesis gas is in the range from 2.0 to 3.0, preferably in the range from 2.0 to 2.5 and most preferably in the range from 2.0 to 2.2.

The enrichment of air can be done by using an air separation unit (ASU). An ASU separates atmospheric air into its primary components, i.e. nitrogen and oxygen and sometimes also argon and other rare inert gases. One of the most common methods for air separation is cryogenic distillation. Cryogenic ASUs are built to provide nitrogen or oxygen and often co-produce argon. Other methods, such as membrane separation, pressure swing adsorption (PSA) and vacuum pressure swing adsorption (VPSA), are commercially used to separate a single component from atmospheric air.

The invention is illustrated further by way of the following example.

EXAMPLE

The flue gas recycle method according to the invention was compared to two prior art methods without flue gas recycle, one with combined ammonia and methanol co-production and one with production of ammonia only.

In the following table 1, the process according to the invention is compared to both prior art combined ammonia and methanol production and prior art ammonia production only. In table 2, the process according to the invention is compared to a prior art urea production with a lean gas. In the latter case, the process according to the invention is used for ammonia production only.

TABLE 1

|  | prior art $NH_3$ and $CH_3OH$ co-production | prior art $NH_3$ production only | process of invention |
| --- | --- | --- | --- |
| Total HC (feed + fuel), $Nm^3/h$ | 81255 | 76276 | 72738 |
| Flue gas recirc., $Nm^3/h$ | 0 | 0 | 11472 |
| EA, $Nm^3/h$ | 0 | 0 | 38995 |
| $NH_3$ prod., MTPD | 1492 | 2050 | 1910 |
| $CH_3OH$ prod., MTPD | 667 | 0 | 301 |
| Total $CO_2$ emission, MT/h | 57.4 | 50.8 | 22.5 |

TABLE 2

|  | prior art urea production | process of the invention, $NH_3$ prod. only |
| --- | --- | --- |
| Total HC (feed + fuel), $Nm^3/h$ | 76256 | 72738 |
| Flue gas recirc., $Nm^3/h$ | 0 | 11472 |
| EA, $Nm^3/h$ | 0 | 38995 |
| $NH_3$ prod., MTPD | 2050 | 1910 |
| NH3 to storage, MTPD | 99 | 0 |
| urea prod., MTPD | 3443 | 3368 |
| Total $CO_2$ emission, MT/h | 50.8 | 22.5 |

The $CO_2$ emission is from the reformer stack only. Even if it is postulated that part of this can be used for urea production, the $CO_2$ emission will still be around 45 MT/h for prior art production, i.e. twice as much as for production according to the invention.

Thus it appears from the comparisons in tables 1 and 2 that the total $CO_2$ emission is lowered considerably by using the process of the invention.

The invention claimed is:

1. A process for synthesis gas generation, said process comprising the following steps:

treating a hydrocarbon feed in a primary reformer (PR) to obtain a stream of flue gas and a stream of effluent, compressing at least part of the flue gas from the primary reformer in a compressor (C1), and feeding the compressed flue gas and the effluent to a secondary reformer (SR), wherein enriched air (EA) is added either to the primary reformer, the secondary reformer or both.

2. The process according to claim 1, further including the following steps:

passing the secondary reformer effluent through a shift conversion section, removing $CO_2$ from the shift conversion effluent in a $CO_2$ removal section, performing a synthesis gas clean-up of the $CO_2$ removal section effluent, and compressing the resulting stream in a compressor (C3) and transferring the compressed stream to an ammonium loop (AL) for ammonia synthesis, wherein the amount of $CO_2$ removed in the $CO_2$ removal step is sufficient to convert all the ammonia produced in the ammonium synthesis to urea.

3. The process according to claim 1, further including the following steps:

passing the secondary reformer effluent or part thereof through a shift conversion section, removing all the $CO_2$ or part thereof from the shift converter effluent in a $CO_2$ removal section, compressing the $CO_2$ removal section effluent in a compressor (C2) and passing part or all of the compressed effluent through a methanol synthesis section (M), performing a synthesis gas clean-up of the methanol synthesis section effluent, compressing the resulting stream further in the compressor (C3), and transferring the resulting stream to an ammonium loop (AL) for ammonia synthesis, wherein the amount of $CO_2$ removed in the $CO_2$ removal step is sufficient to convert all the ammonia produced in the ammonium synthesis or part thereof to urea.

4. The process according to claim 3, further including the following steps:

feeding the secondary reformer effluent directly to the compressor (C2), and passing the effluent from the compressor (C2) through a methanol synthesis section.

5. The process according to claim 1, wherein the enriched air is obtained by using an air separation unit (ASU).

6. The process according to claim 5, wherein the air separation unit (ASU) is based on membrane separation technology.

7. The process according to claim 1, wherein the hydrocarbon feed is a mixture of steam and optionally pre-reformed hydrocarbons, said hydrocarbons originating from any hydrocarbon source that can be used for reformer feeding.

* * * * *